United States Patent [19]
Parkinson

[11] 3,727,458
[45] Apr. 17, 1973

[54] MEASUREMENT OF RATES OF FLOW OF GASES

[75] Inventor: Michael John Parkinson, Leatherhead, England

[73] Assignee: The British Coal Utilisation Research Association Limited, Leatherhead, Surrey, England

[22] Filed: Dec. 12, 1969

[21] Appl. No.: 884,487

[52] U.S. Cl. ................................................73/194 A
[51] Int. Cl. ...........................G01f 1/00, G01p 5/00
[58] Field of Search ........................73/194 A, 24, 30

[56] References Cited

UNITED STATES PATENTS

| | | | |
|---|---|---|---|
| 3,145,564 | 8/1964 | Poole et al. | 73/30 X |
| 2,841,775 | 7/1958 | Saunders | 73/194 A X |
| 3,473,378 | 10/1969 | Yoshiyama et al. | 73/194 A |
| 3,028,749 | 4/1962 | Welkowitz | 73/32 |

FOREIGN PATENTS OR APPLICATIONS

| | | | |
|---|---|---|---|
| 798,323 | 7/1958 | Great Britain | 73/24 |
| 127,077 | 0/1959 | U.S.S.R. | 73/194 A |

Primary Examiner—Charles A. Ruehl
Attorney—Hall and Houghton

[57] ABSTRACT

A method and apparatus are described which enable the rate of flow of gas in a tube to be measured accurately. The invention uses two sources of acoustic signals to propagate upstream and downstream respectively across the gas flow. The signals are picked up by receivers and the phase difference measured to give an indication of velocity of the gas. A correction factor is added by measuring a third signal propagated perpendicular to the gas flow over varying distances across the tube. The correction factor takes account of changes in the gas composition affecting the molecular weight of the gas.

29 Claims, 6 Drawing Figures

MICHAEL J. PARKINSON
INVENTOR

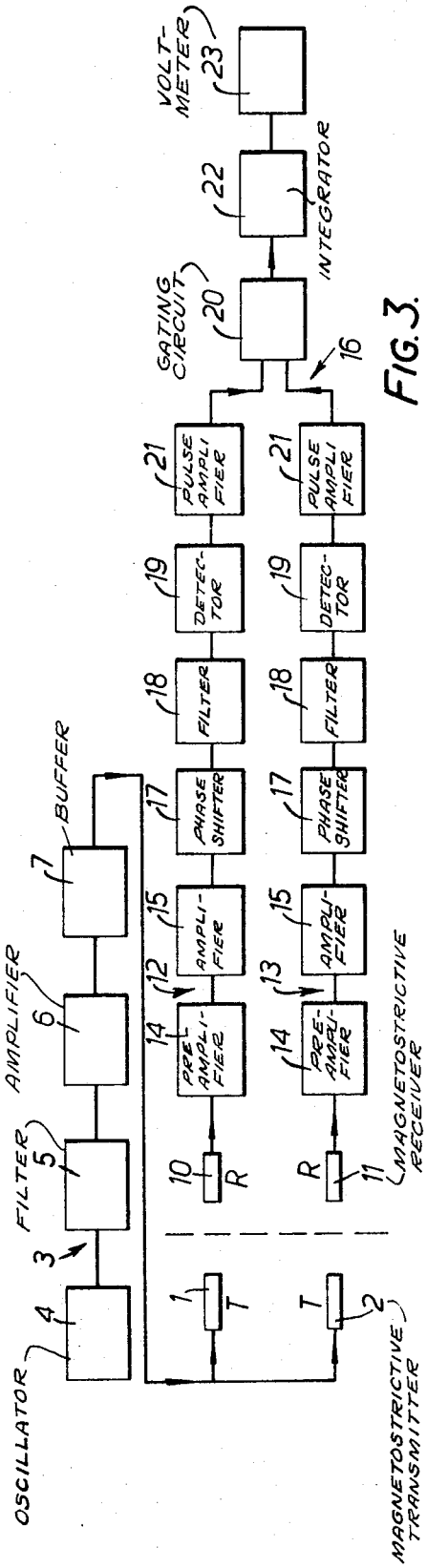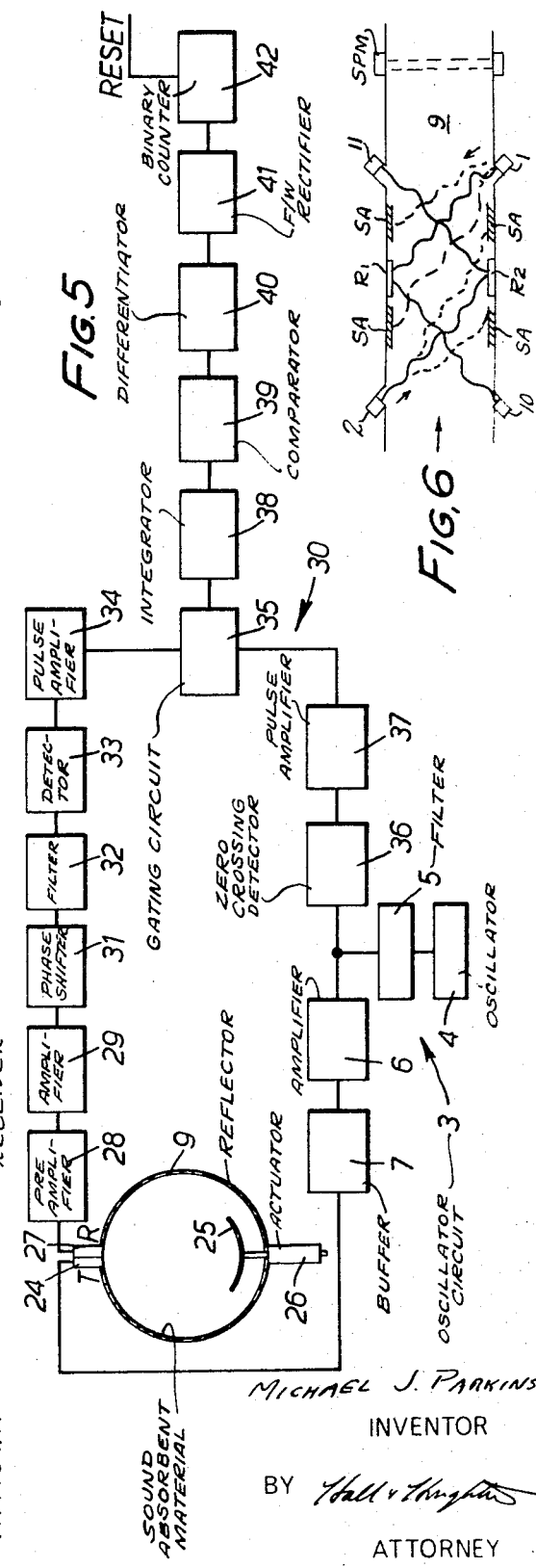

MEASUREMENT OF RATES OF FLOW OF GASES

The invention relates to the measurement of rates of flow of gases.

For the control of industrial processes it is often necessary to determine the rate of flow of gases. Methods of doing this employing ultrasonic waves have previously been proposed but in these methods in order to calculate the rate of flow of the gas the velocity of sound in the gas must also be known. The previous proposals have generally contemplated ascertaining the velocity of sound by determining the partial pressures of the gaseous components by analysis of a sample of the gas. This procedure, however, does not in general yield a very accurate value for the velocity of sound and the time taken to make the necessary measurements gives rise to difficulties when, as is often the case, the temperature and the composition of the gas are varying.

An object of the invention is to provide a method of measuring the rate of flow of a gas which comprises the steps of propagating a first acoustic signal through the gas in an upstream direction, propagating a second acoustic signal through the gas in a downstream direction, the two acoustic signals being of the same known frequency and having a known phase relationship at their respective points of propagation, receiving the first and second signals after they have travelled over known path lengths, obtaining a resultant signal dependent on the total phase difference between the first and second signals at their respective points of reception, propagating a third acoustic signal of known frequency through the gas in a direction perpendicular to the direction of flow of the gas, receiving the third signal after it has travelled over a certain path length, altering by a known amount the path length of the third signal in the gas and obtaining a signal dependent on the total difference in phase of the third signal at its point of reception before and after the alteration of the path length, and combining the signal dependent on the said total phase difference between the first and second signals with the signal dependent on the said total phase difference of the third signal to obtain a measure of the rate of flow of the gas.

A further object of the invention is to provide apparatus for measuring the rate of flow of gas, which comprises means for propagating a first acoustic signal through the gas in an upstream direction, means for propagating a second acoustic signal through the gas in a downstream direction, the propagating means being such that the two acoustic signals are of the same known frequency and have a known phase relationship at their respective points of propagation, a first receiver for receiving the first signal positioned at a point upstream of and at a known distance from the point of propagation of the first signal, a second receiver for receiving the second signal positioned at a point downstream of and at a known distance from the point of propagation of the second signal, means for obtaining a resultant signal dependent on the total phase difference between the first and second signals at their respective points of reception, means for propagating a third acoustic signal of known frequency through the gas in a direction perpendicular to the direction of flow of the gas, a third receiver for receiving the third signal after it has travelled over a certain path length, means for altering by a known amount the path length of the third signal in the gas and means for obtaining a signal dependent on the total difference in phase of the third signal at its point of reception before and after the alteration of the path length, and means for combining the signal dependent on the said total phase difference of the first and second signals with the signal dependent on the said total phase difference of the third signal of obtain a measure of the rate of flow of the gas.

Both the total phase difference between a signal sent in an upstream direction and one sent in a downstream direction over known path lengths, and the total difference in phase of a signal sent perpendicularly to the direction of flow either at its point of propagation and its point of reception or at its point of reception before and after the alteration of its path length depend on the velocity of sound in the gas and the mean gas velocity. Furthermore, expressions for the said total phase differences both involve functions of the difference between the square of the velocity of sound in the gas and the square of the mean velocity of the gas. Thus, the measurements of the total phase differences can readily be combined to give a measure of the rate of flow of the gas.

Preferably, the first and second signals travel over equal path lengths.

When the third signal is propagated as a continuous sine wave, and the distance between its point of propagation and its point of reception is such that the time taken by the signal to travel between the points is less than the period of the wave, the phase difference of the signal at these two points will be the total phase difference. Throughout the specification the expression "total phase difference" is used to mean the phase difference including any integral multiple of $2\pi$ and the expression "phase difference" is used to mean the phase difference excluding any integral multiple of $2\pi$. In cases where the total phase difference does not include any integral multiple of $2\pi$ then the total phase difference will, of course, be equal to the phase difference. If, however, the time taken is longer than the period (and this will generally be the case) then the total phase difference, of the signal at its point of propagation and its point of reception will include an integral multiple of $2\pi$, which multiple cannot be ascertained from a direct measurement of the phase difference at the two points. To avoid this difficulty a single acoustic pulse may be transmitted. If, however, it is desired to use a continuous sine wave, the amplitude or the frequency of the wave may be modulated by a periodic signal having a period greater than the time taken for the signal to travel from its point of propagation to its point of reception, the total difference in phase of the third signal at the two points being measured with respect to the period of the modulating signal (so that the total difference in phase will then be the phase difference). If it is convenient to measure the change in the total phase difference as the gas is accelerated from rest up to the rate of flow to be measured, frequency division may also be used.

Advantageously, however, the path length of the third signal is altered by a known amount and the total phase difference of the signal at its point of reception before and after the alteration in path length is measured. To alter the path length, the point of reception may be moved. If the change in the path length is less than a whole apparent wavelength (that is to say, the wavelength of the signal with respect to which the phase difference is measured) the phase difference can be obtained by a direct comparison of the phase of the signal before and after the path length is altered. Preferably, however, the path length is altered by an amount greater than a whole apparent wavelength and the number of whole apparent wavelengths contained in the distance by which the path length is altered is ascertained. This may be done by means of a zero-crossing device and appropriate associated circuitry which counts the number of times the wave form of the third signal passes through zero during the alteration of the path length of the third signal.

Advantageously, the third acoustic signal is propagated in a direction perpendicular to the direction of flow of the gas, is reflected by a reflector in the opposite direction and is received at a point adjacent to its point of propagation. This arrangement allows the path length of the signal to be altered by adjusting the distance of the reflector from the points of propagation and reception which need not, themselves, be moved. Preferably, the reflector is moved by means of a pneumatic or hydraulic actuator.

In measuring the phase difference between the first and second signals, difficulties can arise if stray waves reflected off the wall of a conduit in which the gas is flowing reach the points of reception. Advantageously, transmitters which propagate acoustic beams of sufficiently narrow angle are used and they are so arranged relative to their respective receivers that stray reflected waves reaching the receivers are substantially eliminated or their intensity considerably reduced. Preferably, the narrow angle of each of the beams is less than 50° and each of the transmitter-receiver axes is at an acute angle to the direction of flow of the gas of between 49° and 16°.

Advantageously, as illustrated in FIG. 6, hereinafter described, material absorbent to acoustic waves, for example, rubber, is used to absorb stray waves that would otherwise have been reflected by the wall of the conduit.

Advantageously, as illustrated in FIG. 6, hereinafter described, the first acoustic signal is propagated through the gas in an upstream direction, is reflected, and is then received and the second acoustic signal is propagated in a downstream direction, is reflected, and is then received. Thus, each of the first and second receivers can be positioned on the same side of the conduit through which the gas is flowing as its respective transmitter, which makes the distance between each receiver and its respective transmitter easier to measure. Further, if the rate of flow of the gas varies to such an extent that in order for the time difference between the signals on reception to be less than a whole period of the wave at both the lowest and the highest rates of flow of the gas, the distance measured in a direction parallel to the direction of flow of the gas between the transmitter and the receiver for each of the first and second signals may have to be very small. It is easier to arrange for this small distance to be set accurately if the transmitter and the receiver of each signal are positioned on the same side of the conduit. Material absorbent to acoustic waves may be arranged between the transmitter and the receiver of each of the first and second signals to absorb waves that would otherwise have been reflected by the wall of the conduit more than once.

The first and second signals may be propagated through the gas in axial planes at 90° to one another. This arrangement is convenient when the transmitters and the receivers are on the same side of the conduit, and a more representative measurement of the rate of flow of the gas can be obtained.

Even when there is a velocity gradient across the conduit, the method and apparatus of the invention can still be used to measure the mean rate of flow of a gas.

Advantageously, each of the first, second and third acoustic signals is of a frequency greater than 20 kilocycles per second but is not of a frequency great enough for attenuation of the waves due to the gas through which it is passed to be appreciable. The first, second and third signals may all be derived from a common source.

The invention will now be described by way of example with reference to the accompanying drawings, in which:

FIG. 3 is a circuit diagram for the apparatus of FIGS. 1 and 2;

FIG. 5 is a circuit diagram for the apparatus of FIG. 4; while FIG. 6 is a diagram illustrating certain modifications.

Figure 1:
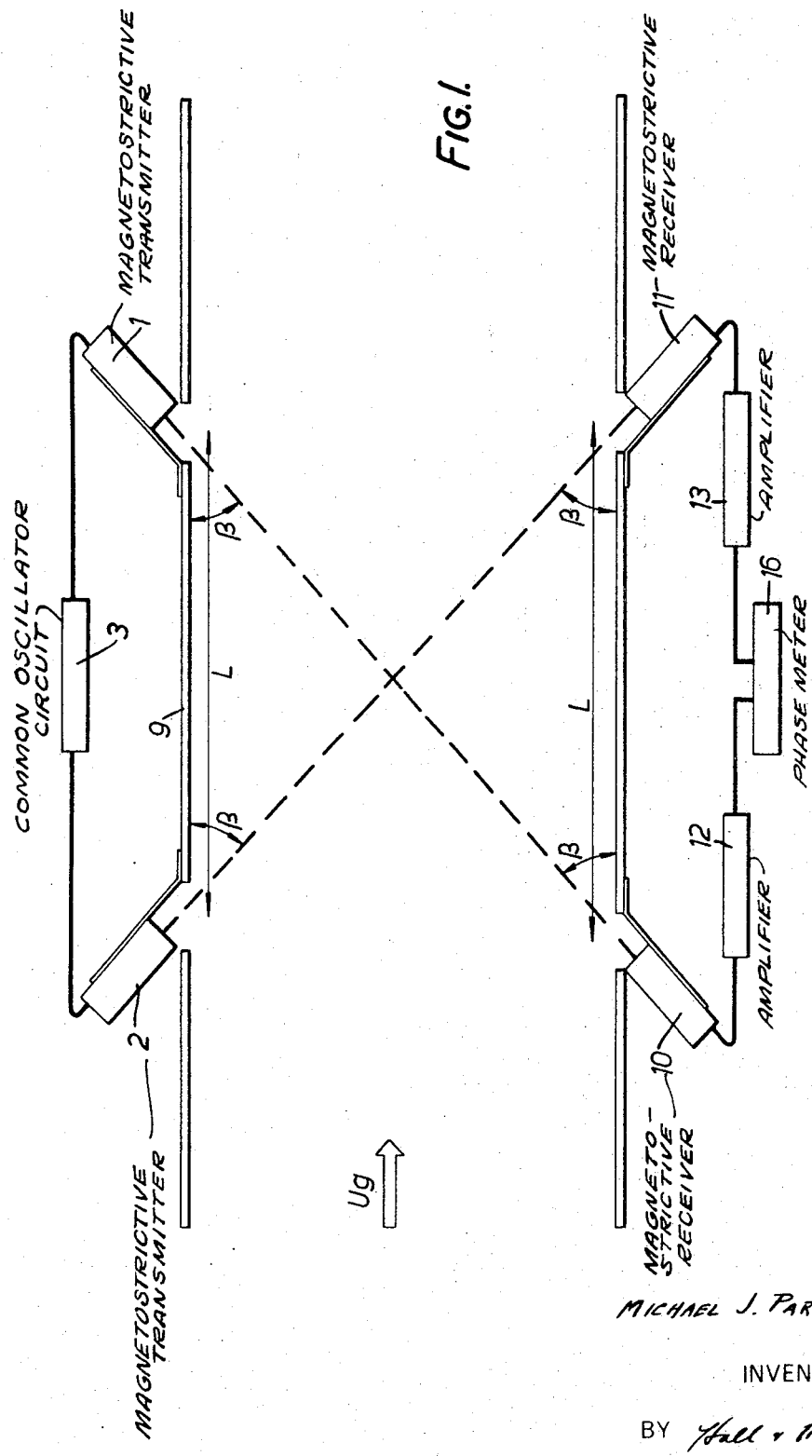
FIG. 1 is a diagramatic cross-section of a part of the apparatus.
Figure 2:
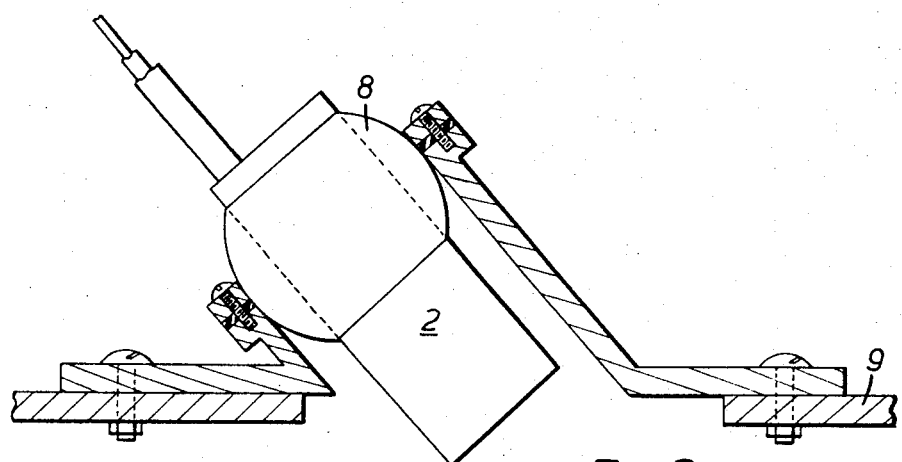
FIG. 2 is a detail on a larger scale of the apparatus shown in FIG. 1.

Referring to FIGS. 1 to 3 of the accompanying drawings, magnetostrictive transmitters 1 and 2, respectively, are arranged to propagate ultrasonic signals of a frequency of 40 kilocycles per second derived from a common oscillator circuit, indicated generally by the reference numeral 3, which comprises a crystal oscillator 4, a filter 5, an amplifier 6 and a buffer 7, as shown in FIG. 3. The transmitters 1 and 2 are each secured to phosphor-bronze balls 8 which are pivotally mounted in the wall of a duct 9 so that the angle of the axis of each of the transmitters 1 and 2 to the wall of the duct 9 can be adjusted.

Each of the transmitters 1 and 2 is arranged to propagate an ultrasonic signal to one of two magnetostrictive receivers 10 and 11, respectively. The receivers are of the same construction as the transmitters and are also mounted in the wall of the duct 9 in the same way so that the angle of the axis of each of the receivers to the duct wall can be adjusted. One of the transmitters is also arranged to be movable along the duct wall.

The receiver 10 is arranged to feed the signal it receives into an amplifying circuit, indicated generally by the reference numeral 12, and the receiver 11 is arranged to feed the signal it receives into an amplifying circuit, indicated generally by the reference numeral 13. Each of the amplifying circuits 12 and 13 consists of a pre-amplifier 14 and an amplifier 15 as shown in FIG. 3. Each signal is then passed into one side of a phasemeter, indicated generally by the reference numeral 16, which comprises a phase-shifter 17 for each signal, which can be adjusted to allow for any misalignment of the transmitters or receivers, and filters 18 to improve the signal-to-noise ratio. Zero-crossing detectors 19 are arranged to change the varying-amplitude signals into constant-amplitude signals. A gating circuit 20 is arranged to receive the signals after they have each passed through pulse amplifiers 21 and to produce a train of pulses of which the amplitude is constant and the width is dependent on the length of time for which both of the signals from the pulse-amplifiers 21 are positive. An integrator 22 is provided to reduce the pulse train to a d.c. level which is applied to a voltmeter 23 to give directly a measure of the phase difference between the two signals.

Figure 4:
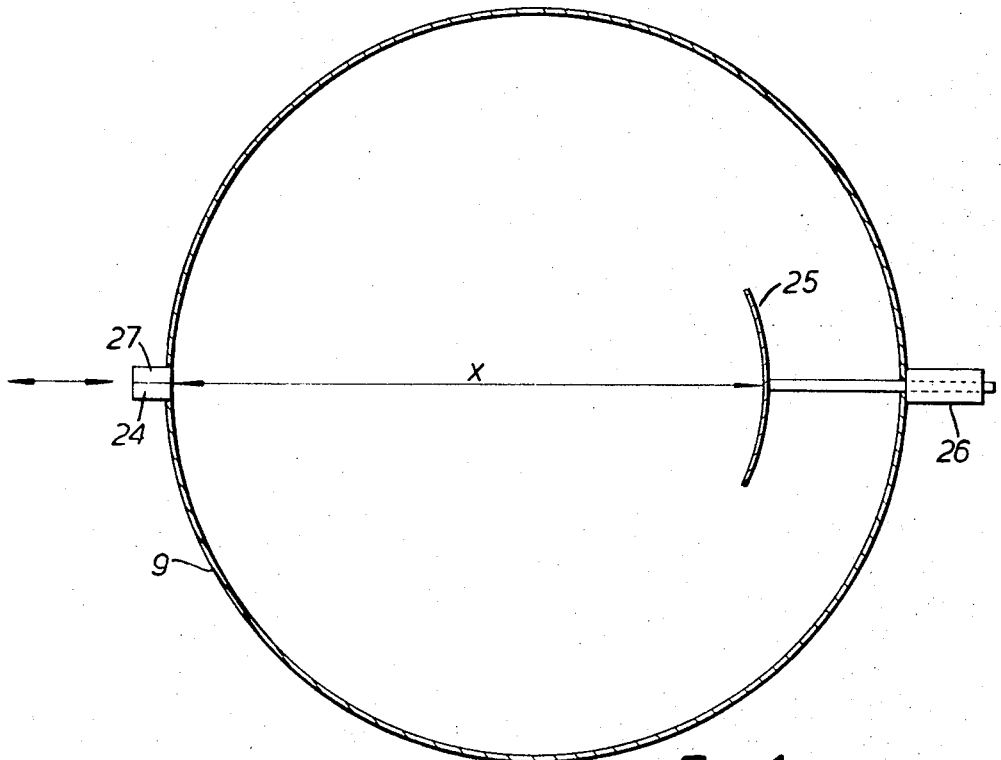
FIG. 4 is a diagramatic cross-section of another part of the apparatus.

Referring to FIG. 4, a third magnetostrictive transmitter 24 is also mounted in the wall of the duct 9 so as to propagate a third ultrasonic signal derived from the oscillator circuit 3 across the duct. A concave reflector 25 secured to one end of an actuator 26 operable by compressed air, is arranged to reflect the ultrasonic signal back to a receiver 27 positioned immediately adjacent to the transmitter 24. The receiver 27 is arranged to feed the signal it receives into an amplifying circuit comprising a pre-amplifier 28 and an amplifier 29 and then into a phasemeter, indicated generally by the reference numeral 30. The phasemeter 30 is arranged so that the signal is passed successively through a phase shifter 31, a filter 32, a zero-crossing detector 33, a pulse amplifier 34 and into one side of a gating circuit 35 in a similar way to the first and second signals. A signal directly from the oscillator circuit 3 is arranged to be fed through a zero-crossing detector 36 and a pulse amplifier 37 into the other side of the gating circuit 35. The circuit is so arranged that the signal from the gating circuit 35 is fed into an integrator 38, a comparator 39, a differentiator 40, a full-wave rectifier 41 and a binary counter 42, to obtain a measure of the total phase difference of the signal before and after the reflector 25 is moved across the duct 9 by means of the actuator 26.

As an example of typical dimensions, the duct may be of radius 24 inches and the reflector of radius 12 inches.

In operation, when gas is flowing with a velocity $Ug$ along the duct 9, an ultrasonic signal of a frequency of 40 kilocycles/sec. from the oscillator circuit 3 is propagated across the duct 9 by the transmitter 1 in an upstream direction. The signal is received by the receiver 10, arranged at distance $L$ measured parallel to the direction of flow of the gas from the transmitter 1. A second ultrasonic signal from the oscillator circuit 3 of the same frequency as the first signal and having a known phase relation with it, is propagated simultaneously with the first signal across the duct 9 by a transmitter 2 in a downstream direction. The signal is received by the receiver 11 arranged at a known distance $L$ from the transmitter 2 equal to that of the receiver 10 from the transmitter 1 and measured parallel to the direction of flow of the gas. The signals received are amplified by the amplifying circuits 12 and 13 and are then fed into the phasemeter 16 to produce a signal dependent on the phase difference between the two signals. To ensure that the distances $L$ are equal the phase difference between the signals can be measured and adjusted to zero when the gas in the duct 9 is not flowing. The distances $L$ are also arranged to be such that the total phase difference of the signals at reception is not greater than $2\pi$ when the gas is flowing at the rate of flow to be measured. The time difference $\Delta t_1$ between the two signals reaching their respective receivers (of which the difference in phase is a measure) is given by the expression $$\Delta t_1 = (2 UgL)/(a^2 - Ug^2)$$

where $a$ is the velocity of sound in the gas.

The third ultrasonic signal from the oscillator circuit 3 is propagated across the duct 9 in a direction perpendicular to the direction of flow of the gas by the transmitter 24. The signal is reflected by the reflector 25 back across the flow and is received by the receiver 27. The path length if then altered by a known distance $x$ by moving the reflector 25 by means of the actuator 26 towards the transmitter 24 and a signal dependent on the total phase difference of the signals received by the receiver 27 is obtained. The whole number of wavelengths through which the reflector is moved is counted by a zero-crossing device and associated circuitry.

The time difference $\Delta t_2$ between the third signal travelling over the two difference path lengths (of which the total difference in phase is a measure) is given by the expression $$\Delta t_2 = (2x)/(a^2 - Ug^2)$$

where $2x$ is the change in path length.

Combining the two equations gives an expression for the rate of flow of the gas $Ug$ as $$Ug = (2x^2)/L (\Delta t_1)/(\Delta t_2)^2$$

Since $L$ and $x$ are known, by suitably combining the signal dependent on the phase difference between the first and second signals and the signal dependent on the total phase difference of the third signal before and after the alteration of the path length, a measure of the rate of flow of the gas can be obtained. A signal dependent on the concentration of solid particles flowing in suspension in the gas can also be obtained by measuring the attenuation of $\beta$-rays by the gas, and hence the mass flow can be measured.

As diagrammatically illustrated in the arrangement of FIG. 6, the first acoustic signal is propagated upstream from 1, reflected at reflector R1, and received at 10 and the second is propagated downstream from 2, reflected at R2, and received at 11, as above described; and the sinewave nature of the acoustical waves is illustrated diagrammatically, as are the use of sound absorbent material SA to absorb stray waves that would otherwise be reflected by the wall of the conduit, and the combination with the solid particle measuring means SPM, all as above described.

I claim:

1. A method of measuring the rate of flow of gas which comprises the steps of propagating a first acoustic signal through the gas in an upstream direction, propagating a second acoustic signal through the gas in a downstream direction, the two acoustic signals being of the same known frequency and having a known phase relationship at their respective points of propagation, receiving the first and second signals after they have travelled over known path lengths, obtaining a resultant signal dependent on the total phase difference between the first and second signals at their respective points of reception, propagating a third acoustic signal of known frequency through the gas in a direction perpendicular to the direction of flow of the gas, receiving the third signal after it has travelled over a certain path length, altering by a known amount the path length of the third signal in the gas and obtaining a signal dependent on the total difference in phase of the third signal at its point of reception before and after the alteration of the path length, and combining the sinal dependent on the said total phase difference between the first and second signals with the signal dependent on the said total phase difference of the third signal to obtain a measure of the rate of flow of the gas.

2. A method as claimed in claim 1, wherein the third acoustic signal is a continuous sine wave, the amplitude or the frequency of which is modulated by a periodic signal having a period greater than the time taken for the third signal to travel from its point of propagation to its point of reception, the total phase difference of the third signal being measured with respect to the period of the modulating signal.

3. A method as claimed in claim 1, wherein the path length of the third signal is altered by moving the point of reception.

4. A method as claimed in claim 1, wherein the path length is altered by an amount greater than a whole apparent wavelength and the number of whole apparent wavelengths contained in the distance by which the path length is altered is ascertained.

5. A method as claimed in claim 4, wherein the number of whole apparent wavelengths contained in the distance by which the path length of the third signal is altered is ascertained by means of a zero-crossing device and appropriate associated circuitry arranged to count the number of times the wave form of the third signal passes through zero during alteration of the path length of the third signal.

6. A method as claimed in claim 1, wherein the third acoustic signal is propagated in a direction perpendicular to the direction of flow of the gas, is reflected by a reflector in the opposite direction and is received at a point adjacent to its point of propagation.

7. A method as claimed in claim 6, wherein the path length of the third signal is altered by adjusting the distance of the reflector from the points of propagation and reception.

8. A method as claimed in claim 7, wherein the reflector is moved by means of a pneumatic or hydraulic actuator.

9. A method as claimed in claim 1, wherein the first and second signals are continuous sine waves, the difference in time taken by the first and second signals to travel over their respective paths is longer than one period of said sine waves, and the amplitude or the frequency of the sine waves is modulated by a periodic signal having a period greater than the said difference in time, the total phase difference between the first and second signals at their respective points of reception being measured with respect to the period of the modulating signal.

10. A method as claimed in claim 1, wherein the first and second signals are acoustic beams which are of sufficiently narrow angle and are arranged to be propagated and received in such a way that stray reflected waves received are substantially eliminated or their intensity considerably reduced.

11. A method as claimed in claim 1, wherein the gas is flowing in a conduit and stray waves that would otherwise have been reflected by the wall of the conduit are absorbed by material absorbent to acoustic waves.

12. A method as claimed in claim 1, wherein the first acoustic signal is propagated through the gas in an upstream direction, is reflected, and is then received and the second acoustic signal is propagated in a downstream direction, is reflected, and is then received.

13. A method as claimed in claim 1, wherein the first and second signals are propagated through the gas in axial planes at 90° to one another.

14. A method as claimed in claim 1, wherein the first, second and third signals are all derived from a common source.

15. A method of measuring the rate of flow of a gas as claimed in claim 1, wherein there are solid particles in suspension in the gas.

16. A method of measuring the mass flow rate of a gaseous suspension of solid particles which comprises measuring the rate of flow of the gas as claimed in claim 15 and measuring the concentration of the solid particles in the gas.

17. Apparatus for measuring the rate of flow of gas, which comprises means for propagating a first acoustic signal through the gas in an upstream direction, means for propagating a second acoustic signal through the gas in a downstream direction, the propagating means being such that the two acoustic signals are of the same known frequency and have a known phase relationship at their respective points of propagation, a first receiver for receiving the first signal positioned at a point upstream of and at a known distance from the point of propagation of the first signal, a second receiver for receiving the second signal at a point downstream of and at a known distance from the point of propagation of the second signal, means for obtaining a resultant signal dependent on the total phase difference between the first and second signals at their respective points of reception, means for propagating a third acoustic signal of known frequency through the gas in a direction perpendicular to the direction of flow of the gas, a third receiver for receiving the third signal after it has travelled over a certain path length, means for altering by a known amount the path length of the third signal in the gas and means for obtaining a signal dependent on the total difference in phase of the third signal at its point of reception before and after the alteration of the path length, the signal dependent on the said total phase difference of the first and second signals with the signal dependent on the said total phase difference of the third signal being usable to obtain a measure of the rate of flow of the gas.

18. Apparatus as claimed in claim 17, wherein the third receiver is movable.

19. Apparatus as claimed in claim 18, which comprises a zero-crossing device and appropriate associated circuitry arranged to count the number of times the wave form of the third signal passes through zero during alternation of the path length of the third signal.

20. Apparatus as claimed in claim 17, wherein the means for propagating the third acoustic signal is arranged to propagate the signal in a direction perpendicular to the direction of flow of the gas, a reflector is provided which is arranged to reflect the signal in the opposite direction and the third receiver is arranged to receive the third signal at a point adjacent to the means for propagating the third signal.

21. Apparatus as claimed in claim 20, wherein the reflector is movable so as to allow adjustment of the distance of the reflector from the means for propagating the third signal and the third receiver.

22. Apparatus as claimed in claim 21, which comprises a pneumatic or hydraulic actuator for moving the reflector.

23. Apparatus as claimed in claim 17, wherein the means for propagating the first and second signals are transmitters arranged to propagate acoustic beams of sufficiently narrow angle and the transmitters are so arranged relative to their respective receivers that stray reflected waves reaching the receivers are substantially eliminated or their intensity is considerably reduced.

24. Apparatus as claimed in claim 17, wherein the narrow angle of each of the beams is less than 50° and each of the transmitter-receiver axes is at an acute angle to the direction of flow of the gas of between 49° and 16°.

25. Apparatus as claimed in claim 17, which comprises a conduit through which the gas is arranged to flow and material absorbent to acoustic waves is arranged to absorb stray waves that would otherwise have been reflected by the wall of the conduit.

26. Apparatus as claimed in claim 17, wherein a reflector is provided to reflect the first acoustic signal before it is received by the first receiver and a further reflector is provided to reflect the second acoustic signal before it is received by the second receiver.

27. Apparatus as claimed in claim 26, wherein each of the first and second receivers is positioned on the same side of the conduit through which the gas is flowing as its respective transmitter.

28. Apparatus as claimed in claim 27, wherein material absorbent to acoustic waves is arranged between the transmitter and receiver of each of the first and second signals to absorb waves that would otherwise have been reflected by the wall of the conduit more than once.

29. Apparatus as claimed in claim 17, wherein the means for propagating the first and second signals are arranged to propagate the signals through the gas in axial planes at 90° to one another.

* * * * *